US005295707A

United States Patent [19]
Satoh et al.

[11] Patent Number: 5,295,707
[45] Date of Patent: Mar. 22, 1994

[54] SHOCK ABSORBING AIR BAG CONTAINER

[75] Inventors: Takeshi Satoh; Masato Tagawa, both of Shiga, Japan

[73] Assignee: Takata Corporation, Tokyo, Japan

[21] Appl. No.: 34,518

[22] Filed: Mar. 19, 1993

[30] Foreign Application Priority Data

Mar. 25, 1992 [JP] Japan .................................. 4-067198

[51] Int. Cl.$^5$ .............................................. B60R 21/20
[52] U.S. Cl. .................................. 280/728 A; 280/732; 280/752
[58] Field of Search ........... 280/728 R, 728 A, 728 B, 280/730 R, 732, 734, 736, 741, 743 R, 752

[56] References Cited

U.S. PATENT DOCUMENTS 5,127,669 7/1992 Suran et al. ........................ 280/732
5,145,207 9/1992 Bederka et al. .................... 280/732

Primary Examiner—Karin L. Tyson
Attorney, Agent, or Firm—Kanesaka and Takeuchi

[57] ABSTRACT

An air bag device for a passenger, including a container, an air bag contained in the container, a lid covering the container, an inflator, a pair of extensions extending forward from the sides of a front face of the container, and a U-shaped frame extending along the outside of the container and having a pair of arms hinged to the extensions of the container. The frame also includes a bridge portion bridging the arm portions and a support member protruding from the bridge portion and having an end supported by the container. A pair of notches are formed midway of the arm portions and opposing the container for enhancing buckling of the arm portions when a load heavier than a predetermined level is applied to the frame from the lid. The support member may be supported to the container by means of a pin or bolt such that it is released, when the load heavier than a predetermined level is applied, from the pin or bolt to move in the direction of the load.

8 Claims, 5 Drawing Sheets

SHOCK ABSORBING AIR BAG CONTAINER

BACKGROUND OF THE INVENTION

1. Field of the Invention

The present invention relates to an air bag device for a passenger and, more particularly, to a passenger's air bag device which is improved in shock absorptivity.

2. Description of the Related Art

Conventional passenger's air bag devices are constructed to include: a box-shaped container; an air bag contained in a folded state in the container; a lid covering a front opening of the container; and an inflator disposed at a back of the container for injecting gases to extending the air bag. A conventional passenger's air bag device is arranged to have its lid flush with the instrument panel of an automobile.

Instrument panels are regulated (under the "instrument panel shock absorbing regulations") to have characteristics, in which it will collapse, if shocked, so as to absorb the shocks of an occupant. The lid of the passenger's air bag device also has to clear the instrument panel shock absorbing regulations.

The lid of the air bag device is required to have the deformable characteristics for satisfying the shock absorbing characteristics because the air bag applies serious shocks to the lid when it is extended. However, the lid is required to have a sufficient strength and an excellent durability for shocks having a magnitude lower than a predetermined level. This means that the lid and the container remain improper if they are weakened merely to clear the shock absorbing regulations.

OBJECT AND SUMMARY OF THE INVENTION

The present invention has an object to provide a passenger's air bag device which can reliably satisfy those contradictory characteristics required.

According to a first embodiment of the present invention of a passenger's air bag device, the air bag assembly includes an air bag, gas generator and a container for the air bag, the container including a pair of extensions and a frame having a pair of arms articulated to the extension, a bridge portion and a support member projecting from the bridge portion and connected to the support. The arms include notches for buckling the arm portions when a load heavier than a predetermined level is applied to the frame from the lid.

In a passenger's air bag device, according to a second aspect of the present invention, the support member is not buckled but released from the supporting state of the pin or bolt, when a load heavier than a predetermined level is applied from the inside of the cabin to the lid.

In case the passenger's air bag device of the present invention is mounted in the instrument panel of the automobile, the arm portions of the frame are bent at their notches if shocks stronger than a predetermined level are applied to the lid from the inside of the cabin. At the same time, the support member is buckled (as in the first aspect) or released from its supported state (as in the second aspect). And also, the frame is rotated backward around its leading ends as the rotation center. Thus, the lid will quickly collapse to thereby absorb the shocks applied to the lid.

In the passenger's air bag device of the present invention, neither the arm portions are bent nor is buckled the support member so that the lid is sufficiently borne by the frame if the shocks applied to the lid from the inside of the cabin are weaker than the predetermined level.

DESCRIPTION OF THE PREFERRED EMBODIMENTS

Figure 1:
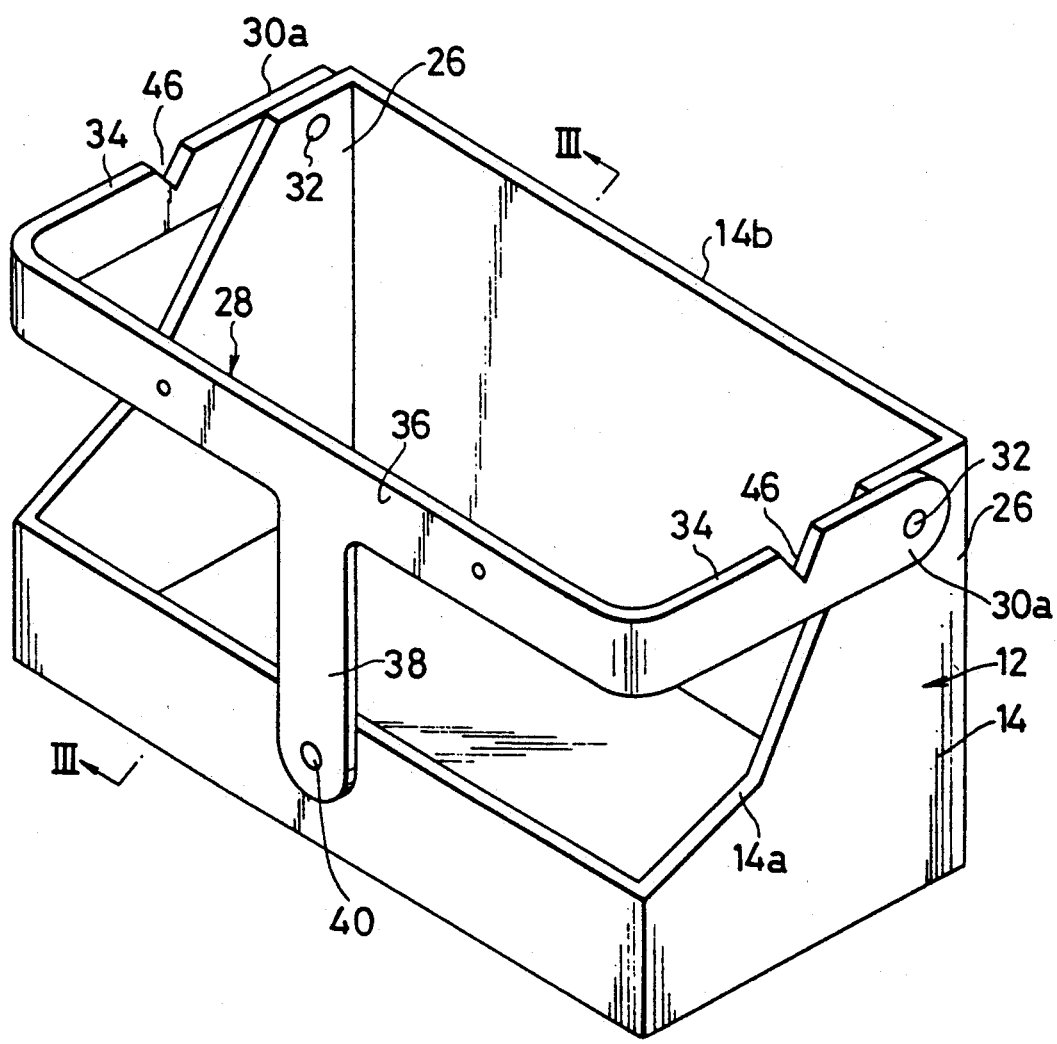
FIG. 1 is a perspective view showing a container and a frame according to the first embodiment of the present invention.
Figure 2:
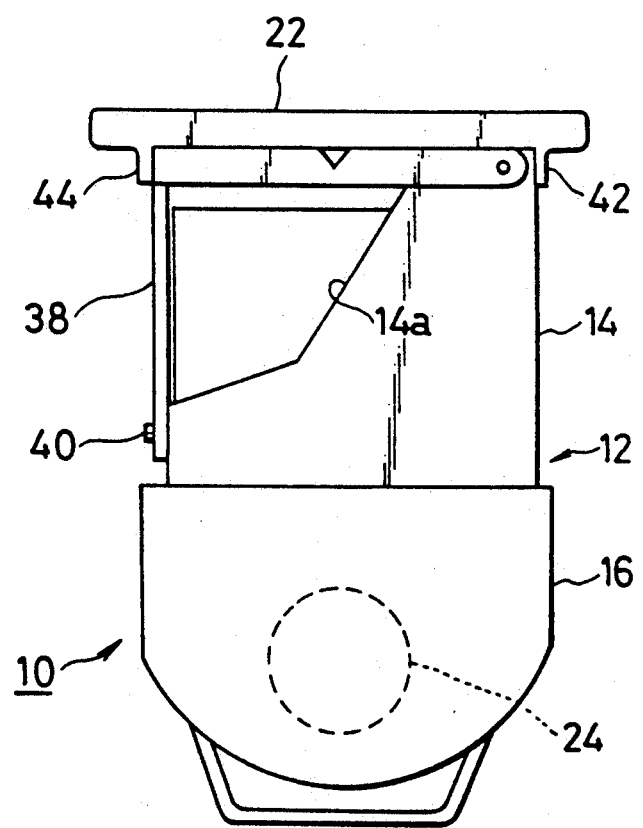
FIG. 2 is a side elevation showing a passenger's air bag device according to the first embodiment.

The present invention will be described in the following in connection with an embodiments thereof with reference to FIGS. 1 to 4.

An air bag device 10 has its container 12 constructed by connecting a rectangular portion 14 and a bottom 16 and has an air bag 18 folded therein. In the present embodiment, a case 20 made of a synthetic resin is fitted in the container rectangular portion 14, to prevent the air bag 18 from coming out sideways from the notch 14a of the rectangular portion 14. The container 12 has its front opening covered with a lid 22 and its back equipped with an inflator 24.

The rectangular portion 14 of the container 12 is formed at its leading end with a pair of extensions 26, to which is hinged a frame 28. This frame 28 is composed of: arm portions 34 having their leading ends 30a hinged to the extensions 26 by means of pins 32; a bridge portion 36 bridging the shoulders of the arm portions 34; and a support member 38 protruded rearwardly of the container from the bridge portion 36 to the container rectangular portion 14. The support member 38 has its leading end fixed on the container rectangular portion 14 by means of a rivet 40.

Figure 3:
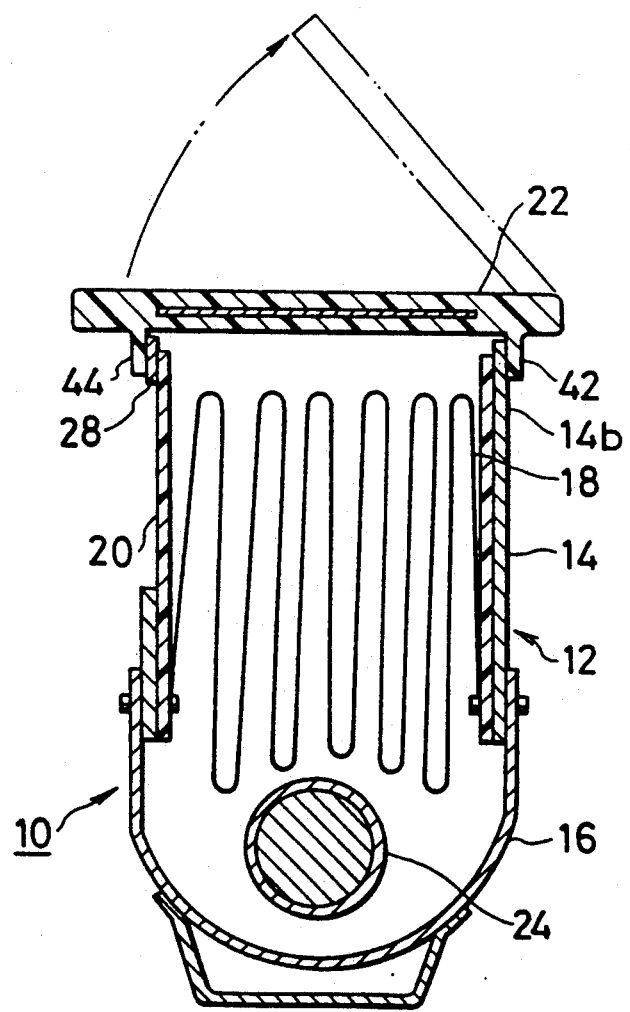
FIG. 3 is a section taken along line III—III of FIG. 1 and shows the passenger's air bag device according to the embodiment.

As shown in FIG. 3, the lid 22 is equipped with mount members 42 and 44, one 42 of which is fixed on one side 14b of the container rectangular portion 14 by means of rivets or the like. The other mount member 44 is fixed on the bridge portion 36 of the frame 28 by means of rivets or the like.

The arm portions 34 and 34 are formed in their midway with notches 46 which are cut from the front of the container 12.

In the passenger's air bag device 10 thus constructed, when the inflator 24 operates to inject the gases, the air bag 18 begins its extension to push the back of the lid 22. Then, the mount member 44 has its root broken so that the lid 22 is opened, as indicated by double dotted lines in FIG. 3, on the side of the mount member 42 as the rotation center to allow the air bag 18 to extend to its full capacity into the cabin of the automobile.

Figure 4:
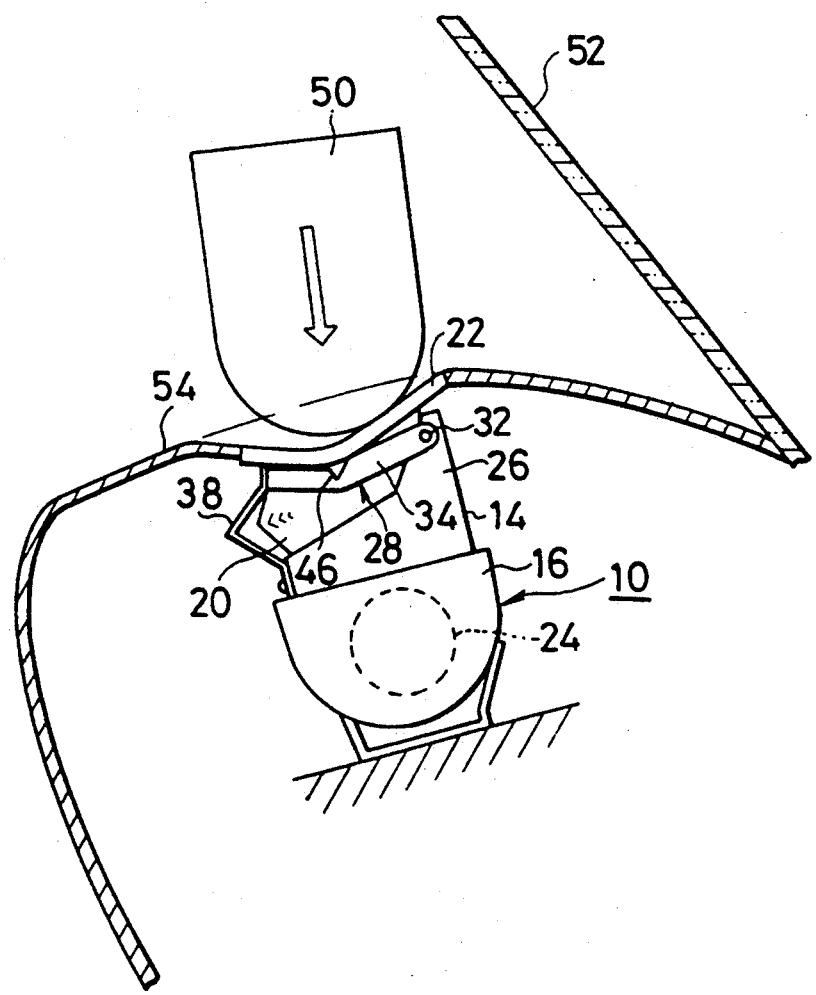
FIG. 4 is an explanatory diagram showing deformation of the passenger's air bag device according to the first embodiment.

If a heavy load is applied from the inside of the cabin to the lid 22 of the passenger's air bag device mounted in the automobile, as shown in FIG. 4, the arm portions 34 and 34 are bent at their notches 46. And the support member 38 will buckle at its midway. As a result, the lid 22 will deform away from the cabin to absorb the shocks applied thereto.

In FIG. 4, reference numeral 50 designates an instrument panel shock impactor. Numerals 52 and 54 designate a windshield and an instrument panel, respectively.

In the embodiment described above, the synthetic resin case 20 is disposed in the container rectangular portion 14 but is deformed by the push of the lid 22 so that it will not obstruct the deformation of the lid 22 when the lid 22 is retracted by the shocks, as described before.

In the present invention, the synthetic resin case 20 can be replaced by another material such as wire netting or punched metal, if this material has a strength sufficient not to obstruct the retracting deformation of the lid 22.

Figure 5:
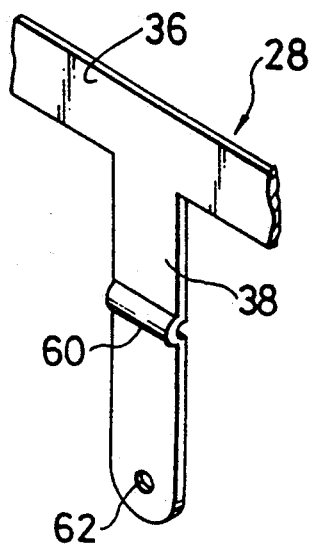
FIG. 5 is a perspective view showing a support member according to another embodiment.
Figure 6:
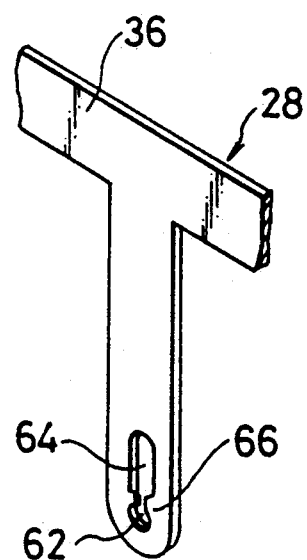
FIG. 6 is a perspective view showing a support member according to still another embodiment.

The foregoing embodiment is constructed to have its support member 38 buckled when the lid 22 is retracted. In order to promote this buckling, the support member 38 may be formed at its midway with a fold 60, as shown in FIG. 5. Numeral 62 appearing in FIG. 5 designates a hole for the rivet 40.

Moreover, the foregoing embodiment is constructed to have its support member 38 buckled when the lid 22 is retracted. In the present invention, however, the support member 38 may be formed with a slot 64 leading from the rivet hole 62. Then, the rivet 40 is usually retained by a neck portion 66, which is left between the rivet hole 62 and the slot 64, but is pushed through the neck portion 66 into the slot 64 when stronger shocks than a predetermined level are applied to the lid 22, so that the support member 38 may move rearwardly of the container.

As has been described hereinbefore, according to the passenger's air bag device of the present invention, when the lid receives the stronger shocks than a predetermined level from the inside of the cabin, it can be quickly retracted to absorb the shocks efficiently. On the other hand, if the shocks are weaker than the predetermined level, the lid is firmly backed up by the frame so that it can be supported by the sufficient strength.

What is claimed is:

1. An air bag device for a passenger, comprising:
a box-shaped container having an open front face and including a pair of opposing sides;
an air bag contained in a folded state in said container;
a lid covering a front opening of said container;
an inflator disposed at a back of said container for injecting gases to extend said air bag;
a pair of extensions extending upward from said pair of opposing sides of said container; and
a U-shaped frame extending along the outside of said pair of opposing sides and another side of said container;
said frame having:
a pair of arms extending across said two opposing sides of said container and hinged to said extensions;
a bridge portion bridging the arm portions;
a support member protruding from said bridge portion to said container and having its leading portion supported by said another side of said container; and
a pair of notches formed midway of said arm portions and opposing said container for buckling said arm portions when a load heavier than a predetermined level is applied to said frame from said lid.

2. A passenger's air bag according to claim 1, wherein said support member has a strength such that it buckles when a load heavier than the predetermined level is applied from said lid.

3. A passenger's air bag device according to claim 1, wherein said support member is formed with a fold for causing the buckling when a load heavier than the predetermined level is applied from said lid.

4. A passenger's air bag device according to claim 1, wherein said support is so fixed on said container that it may move in the direction of said load.

5. A passenger's air bag device according to claim 4, wherein said support member has its leading end supported on said container by fastening means such that it is released, when a load heavier than the predetermined level is applied, from said fastening means to move in the direction of said load.

6. A passenger's air bag device according to claim 5, wherein said fastening means is a rivet.

7. A passenger's air bag device according to claim 5, wherein said fastening means is a bolt.

8. A passenger's air bag device according to claim 5, wherein said support member has: a hole for said fastening means; and a slot leading from said hold so that said fastening means is usually retained by a neck portion, which is left between said hole and said slot, but is pushed through said neck portion into said slot when stronger shocks than a predetermined level are applied to said lid, so that said support member may move in the direction of said loads.

* * * * *